(12) United States Patent
Lee et al.

(10) Patent No.: US 7,953,055 B2
(45) Date of Patent: May 31, 2011

(54) MULTI-CHANNEL MAC APPARATUS AND METHOD FOR WLAN DEVICES WITH SINGLE RADIO INTERFACE

(75) Inventors: Sung-Won Lee, Seoul (KR); Rakesh Taori, Suwon-si (KR); Young-Gon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 993 days.

(21) Appl. No.: 11/822,800

(22) Filed: Jul. 10, 2007

(65) Prior Publication Data

US 2008/0013514 A1    Jan. 17, 2008

Related U.S. Application Data

(60) Provisional application No. 60/830,664, filed on Jul. 14, 2006.

(30) Foreign Application Priority Data

May 3, 2007   (KR) ......................... 10-2007-0043100

(51) Int. Cl.
*H04W 4/00*   (2009.01)
(52) U.S. Cl. ...................... 370/338; 370/468; 455/450
(58) Field of Classification Search .................... None
See application file for complete search history.

(56) References Cited

U.S. PATENT DOCUMENTS

| 7,672,333 | B2* | 3/2010 | Lee et al. | 370/468 |
| 2006/0146718 | A1* | 7/2006 | Yarvis et al. | 370/238 |
| 2006/0256742 | A1* | 11/2006 | Lee et al. | 370/278 |
| 2006/0280152 | A1* | 12/2006 | Lee et al. | 370/338 |

FOREIGN PATENT DOCUMENTS

| KR | 10-2006-0107415 | 10/2006 |
| KR | 10-2006-0117186 | 11/2006 |
| KR | 10-2006-0117187 | 11/2006 |

OTHER PUBLICATIONS

Ashish Raniwala, et al., "Architecture and Algorithms for an IEEE 802.11-Based Multi-Channel Wireless Mesh Network," Computer Science Department, Stony Brook University, Stony Brook, NY, Mar. 2005, pp. 1-12.

* cited by examiner

*Primary Examiner* — Erika A Gary
(74) *Attorney, Agent, or Firm* — NSIP Law

(57) ABSTRACT

A multi-channel Media Access Control (MAC) method and apparatus for a Wireless Local Area Network (WLAN) device with a single radio interface are provided. The multi-channel MAC method includes sensing a common channel when a channel coordination window starts from a start point of a window repeating at regular periods, allocating at least two devices to a destination channel for the started channel coordination window using a channel utilization vector indicating use/nonuse for each of multiple channels, and transceiving a frame over the allocated destination channel.

33 Claims, 8 Drawing Sheets

MULTI-CHANNEL MAC APPARATUS AND METHOD FOR WLAN DEVICES WITH SINGLE RADIO INTERFACE

CROSS-REFERENCE TO RELATED APPLICATION

This application claims the benefit under 35 U.S.C. §119 (e) of a U.S. Patent Application 60/830,664, filed in the United States Patent and Trademark Office on Jul. 14, 2006, and under 35 U.S.C. §119(a) of Korean Patent Application No. 2007-43100, filed on May 3, 2007 in the Korean Intellectual Property Office, the entire disclosures of both of which are incorporated by reference.

BACKGROUND OF THE INVENTION

1. Field of the Invention

The present invention relates to a Media Access Control (MAC) apparatus and method in a Wireless Local Area Network (WLAN) device. More particularly, the present invention relates to a multi-channel MAC apparatus and method for a WLAN device with a single radio interface.

2. Description of the Related Art

The Institute for Electrical and Electronics Engineers (IEEE) 802.11 standard has provided the basic technology for interworking of WLAN devices. IEEE 802.11 has succeeded in implementing timely amendments to the specification (for example, 802.11a, 802.11g, 802.11e, 802.11i, and 802.11n) addressing the different needs that become evident with time.

The core of the WLAN standard is to address a link between an Access Point (AP) and its Stations (STAs). The well-known topology for networking between the AP and the STAs is a Basic Service Set (BSS), and a set of STAs is controlled by a single mediator AP. A system and an integrated Local Area Network (LAN), used for making connections between BSSs, are called a Distribution System (DS). These days, the DS is generally made into a wired DS. The main object of IEEE 802.11s is to specify a function of allowing APs to wirelessly communicate with each other, and to build up a Wireless Distribution System (WDS) in which 802.11s nodes can deliver traffics on behalf of each other.

FIG. 1 schematically illustrates WLAN network elements.

Referring to FIG. 1, unlike the STA of the BSS, the basic element of an IEEE 802.11s mesh network is a Mesh Point (MP) 100. MPs, like the routers in the wired network, deliver frames hop by hop on behalf of other MPs, and provide wireless links between APs, also known as Mesh Access Points (MAPs) 110. Because the wireless links do not require the wired infrastructure, the present invention aims at enabling establishment of such hard-to-control devices, and the establishment of the WLAN mesh network makes it possible to rapidly cover the broader service area.

Because MAC layer routing and a management framework for the mesh network are the core elements of the WLAN mesh network, the present invention focuses on the management of multi-channel MAC operations. Generally, a WLAN access control scheme defines a mechanism in which more than two WLAN devices can communicate with each other in one channel. A single radio interface-based multi-channel access scheme means an independent IEEE 802.11 wireless device. In this scheme, one wireless device supports multiple wireless bands. However, even though one wireless device supports only one band at a time, it is regarded as a single radio interface. This single radio interface is based on an access scheme that uses one channel. This channel, which is commonly used by all devices, is called a common channel.

When the common channel switches to another channel for a multi-channel operation of MPs with a single interface, the state of the common channel is no longer sensed. That is, the MP cannot communicate with an arbitrary MP on the common channel. Even though a transmitting MP selects a data channel used for data transmission by exchanging Request to Switch (RTX) and Clear to Switch (CTX) frames with a receiving MP on the common channel, the transmitting MP cannot hear the RTX and CTX frames on another channel. In addition, because the RTX and CTX frames were designed to address the hidden node problem, the MP may break the ongoing data transmission after the channel switching.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a multi-channel MAC apparatus and method that agrees with the current IEEE 802.11 standard.

Another aspect of exemplary embodiments of the present invention is to provide a multi-channel MAC apparatus and method that does not need a device with multiple wireless interfaces.

Another aspect of exemplary embodiments of the present invention is to provide a multi-channel MAC apparatus and method in which a simple and extended framework is supported in different traffic scenarios.

Another aspect of exemplary embodiments of the present invention is to provide a multi-channel MAC apparatus and method that senses a common channel when a channel coordination window starts, and buffers a desired transmission non-unicast frame when the common channel is in use.

Another aspect of exemplary embodiments of the present invention is to provide a multi-channel MAC apparatus and method that starts frame buffering when a channel utilization vector is updated or an RTX/CTX exchange is detected, and buffers the frame until all MPs located at one-hop distance can use a common channel, for example, until a new channel coordination window starts.

According to an aspect of exemplary embodiments of the present invention, there is provided a multi-channel Media Access Control (MAC) method for a Wireless Local Area Network (WLAN) device with a single radio interface. The multi-channel MAC method includes sensing a common channel when a channel coordination window starts from a start point of a window repeating at regular periods, allocating at least two devices to a destination channel for the started channel coordination window using a channel utilization vector indicating use/nonuse for each of multiple channels, and transceiving a frame over the allocated destination channel.

According to another aspect of exemplary embodiments of the present invention, there is provided a multi-channel Media Access Control (MAC) method for a Wireless Local Area Network (WLAN) device with a single radio interface. The multi-channel MAC method includes sensing a common channel when a channel coordination window starts from a start point of a window repeating at regular periods, buffering a frame when the common channel is in use, and transceiving the buffered frame over the common channel when a new channel coordination window starts.

According to further another aspect of exemplary embodiments of the present invention, there is provided a multi-channel Media Access Control (MAC) apparatus in a Wireless Local Area Network (WLAN) device with a single radio interface. The multi-channel MAC apparatus includes a channel sensor for sensing a common channel when a channel coordination window starts from a start point of a window repeating at regular periods, a controller for allocating at least two devices to a destination channel for the started channel coordination window using a channel utilization vector indicating use/nonuse for each of multiple channels, and a transceiver for transceiving a frame over the allocated destination channel.

According to further another aspect of exemplary embodiments of the present invention, there is provided a multi-channel Media Access Control (MAC) apparatus in a Wireless Local Area Network (WLAN) device with a single radio interface. A computer-readable recording medium storing a program comprise a first set of instructions for sensing a common channel when a channel coordination window starts from a start point of a window repeating at regular periods, a second set of instructions for allocating at least two devices to a destination channel for the started channel coordination window using a channel utilization vector indicating use/nonuse for each of multiple channels; and a third set of instructions for transceiving a frame over the allocated destination channel.

BRIEF DESCRIPTION OF THE DRAWINGS

The above and other aspects, features and advantages of exemplary embodiments of the present invention will become more apparent from the following detailed description when taken in conjunction with the accompanying drawings in which.

DETAILED DESCRIPTION OF EXEMPLARY EMBODIMENTS

Figure 1:
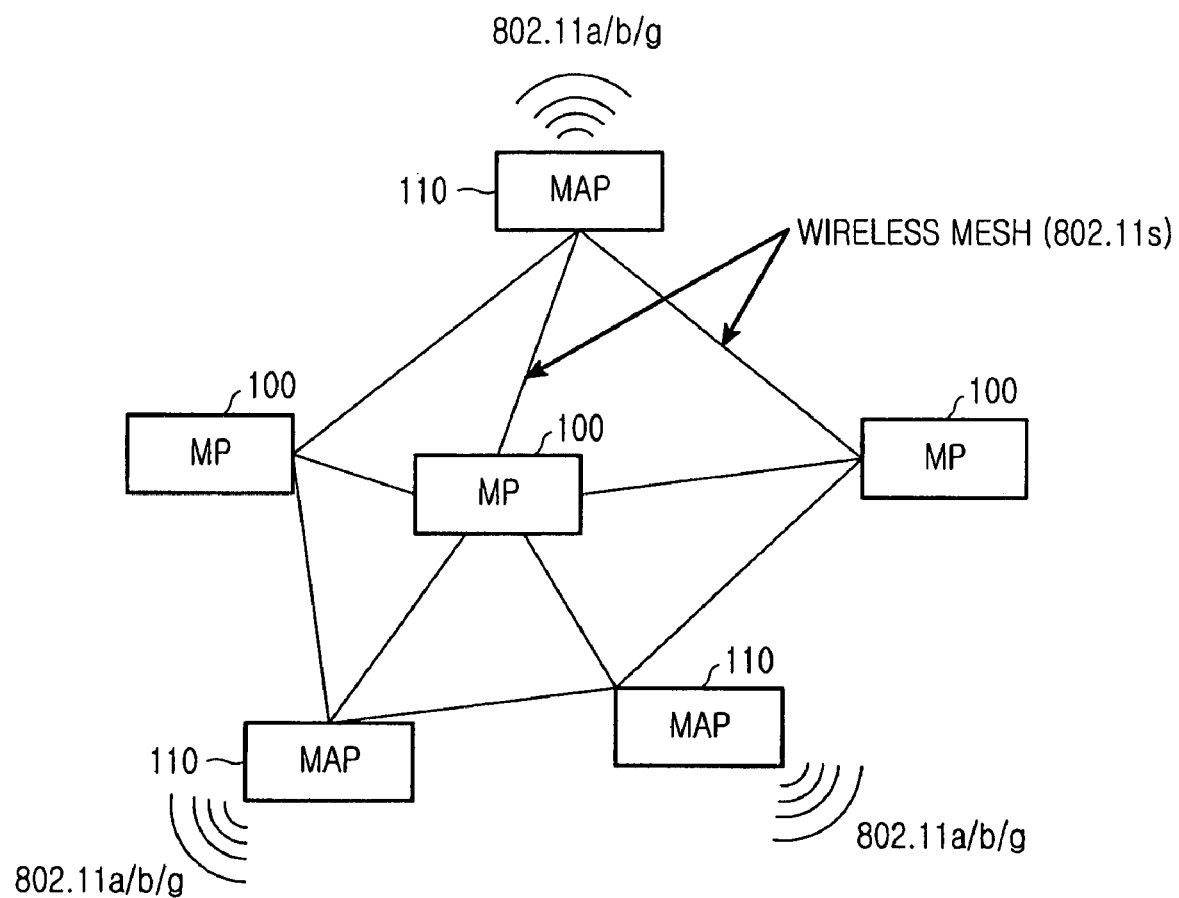
FIG. 1 is a diagram schematically illustrating WLAN network elements.

Exemplary embodiments of the present invention will now be described in detail with reference to the annexed drawings.

In the drawings, the same or similar elements are denoted by the same reference numerals even though they are depicted in different drawings. In the following description, a detailed description of known functions and configurations incorporated herein has been omitted for clarity and conciseness.

In the following description, exemplary embodiments of the present invention will provide a multi-channel MAC apparatus and method for a WLAN device with a single radio interface, and also provide a multi-channel MAC apparatus and method in which a simple and extended framework is supported in different traffic scenarios.

In addition, an exemplary embodiment of the present invention provides a Common Channel Framework (CCF) designed to enable an operation of a device with only a single radio interface in order to overcome the limit of a device with multiple radio interfaces. Each of MPs according to the exemplary embodiments of present invention buffers a frame generated in an application layer at intervals of a period of the CCF, or every repetitive window. The core in the CCF is a common channel. In the common devices (for STAs and AP, their 802.11s standard functions have not been realized), the common channel, because it is equal to other channels, does not affect operations of the common devices.

Device pairs or clusters select channels other than the common channel using the CCF, and then return to the common channel. For this time, devices exchange more than one data frames, or buffer the data frames when they are in the situation where the data frames cannot be exchanged. Channel coordination itself is performed on the common channel by exchanging control frames or management frames that deliver information on a destination channel. The transmission synchronized through this process is achieved on multiple channels.

Single-radio MPs (or MPs with a single radio interface), which are switching to another channel, have no knowledge of the network state (for example, operation states of Network Allocation Vectors (NAVs) and neighbor nodes) on the common channel. Therefore, a multi-channel MAC protocol has been developed for the single-radio MPs that should address the following issues. First, the multi-channel MAC protocol facilitates connection between arbitrary MPs that can be occupied on different channels. Second, the multi-channel MAC protocol facilitates prevention of the connection break between MPs due to a loss of network state information.

To address the foregoing two issues, the following matters should be taken into consideration. First, the concept of a Channel Coordination Window (CCW) presented in the framework should be introduced. At a CCW start point, all MPs are tuned on the common channel. This makes arbitrary MPs establish communication with each other. Second, at the CCW start point, the channel occupied state is reset, and the MPs select available channels. Once a channel is selected by one MP, the channels selected by other MPs are indicated as 'unavailable'. CCW is repeated at intervals of a period P, and CCW duration generally corresponds to a part of the period P. Third, all MPs located at one-hop distance buffer their desired transmission frames until all MPs can use the common channel. That is, when all MPs can use the common channel, or when all MPs have exchanged RTX/CTX, the MPs buffer their desired transmission frames. The RTX/CTX includes a request message for transmitting a frame, and a response message responding thereto. The buffering is achieved until the CCW repeating at intervals of the period P starts. In addition, the frame is a non-unicast frame, and a multicasting frame or a broadcasting frame can correspond to the frame.

Figure 2:
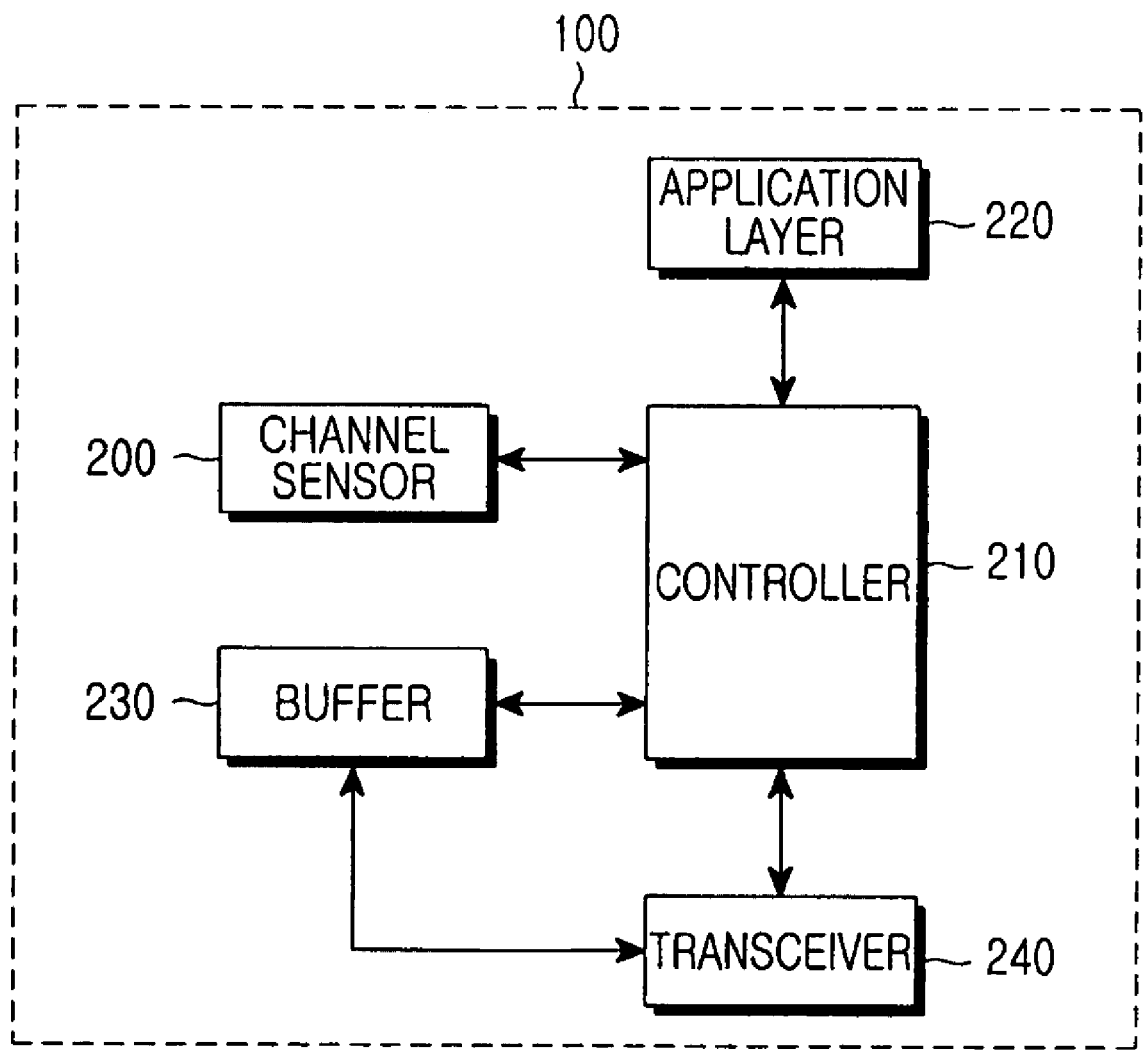
FIG. 2 is a block diagram illustrating a WLAN device with a single radio interface according to an exemplary embodiment of the present invention.

FIG. 2 illustrates a WLAN device with a single radio interface according to an exemplary embodiment of the present invention.

Referring to FIG. 2, the WLAN device with a single radio interface according to an exemplary embodiment of the present invention includes a channel sensor 200 for sensing a common channel when a CCW starts from a start point of a window that repeats at regular periods, a controller 210 for storing data of an application layer 220 in a buffer 230 when the sensed common channel is unavailable, and a transceiver 240 for transceiving the stored data when the common channel is in an available state.

The controller 210 controls the overall operation of an MP. In addition, the controller 210 senses a common channel by controlling the channel sensor 200 periodically or when data of the application layer 220 is generated. Such sensing is achieved commonly even for MPs located at one-hop distance. The MPs located at one-hop distance each buffer the frame generated from the application layer 220 until they can use the common channel by periodically exchanging the sensing results, or the MPs perform the buffering until a CCW repeating at intervals of a period P starts. Such buffering starts when an RTX/CTX exchange is sensed or a channel utilization vector is changed or updated. The buffered frame, which is a non-unicast frame, can be a multicasting frame or a broadcasting frame.

The channel sensor 200, under the control of the controller 210, senses a common channel periodically or upon receipt of beacon frames from neighbor MPs. The beacon frame includes a window P and a CCW value for each of the MPs. In this manner, the MPs transmit the beacon frames to the neighbor MPs, thereby allowing the neighbor MPs to find P and CCW. If the common channel is sensed in this way, it is possible not only to determine which MPs are now transmitting and receiving data over the sensed common channel, but also to determine the RTX/CTX frames being exchanged between the neighbor MPs. Such data and/or RTX/CTX frames are repeated at intervals of the window P.

When the common channel is sensed in this manner, the controller 210 determines whether the common channel is available. If the common channel is unavailable and in this state, a non-unicast frame to be transmitted to other MPs is generated from the application layer 220, the controller 210 stores the non-unicast frame in the buffer 230. This buffering is started when an RTX/CTX exchange is sensed or a channel utilization vector is updated, and the buffering is terminated at a start point of a new CCW. In the state where the neighbor MPs can use the common channel, the controller 210 transmits the non-unicast frames stored in the buffer 230 to the neighbor MPs via the transceiver 240 periodically or through the beacon frames received from the neighbor MPs. Such transmission includes multicasting and broadcasting.

Figure 3:
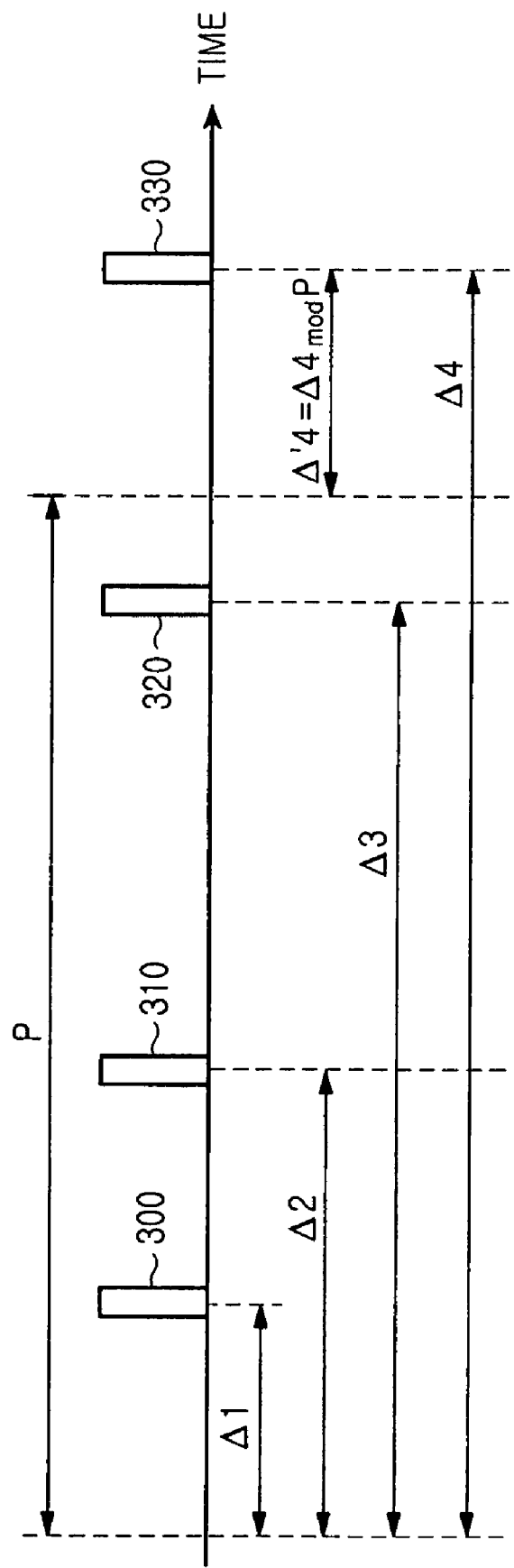
FIG. 3 is a diagram illustrating distribution and synchronization of related parameters in a common channel framework according to an exemplary embodiment of the present invention.

FIG. 3 illustrates distribution and synchronization of related parameters in a common channel framework according to an exemplary embodiment of the present invention.

Referring to FIG. 3, an MP senses beacon frames 300, 310, 320 and 330 through a WLAN association process. If the beacon frames are not sensed, the MP transmits a beacon frame having its own window P and CCW value. The window P and CCW value are transmitted as WLAN information elements of the beacon. The P and CCW value should be reported to all MPs in the mesh network. Each MP, when transmitting the beacon frame, transmits an offset $\Delta$ together with the window P and CCW value. The offset $\Delta$, the time that has elapsed after a start of the current window P, corresponds to a remainder obtained by dividing a hardware timer value by P without synchronizing the hardware timer value. That is, the offset $\Delta$ is the time that has elapsed after a start of P (indicated as modulo P). Actually, the MPs simply deliver P and CCW values included in beacon frames received from other MPs. Each MP calculates its own offset $\Delta$ before transmitting the beacon frame. In this case, when new window P and CCW value are different from the current values, the MP, upon receiving a beacon, can calculate an offset $\Delta$ using Equation (1).

New offset($\Delta$new)=(received offset($\Delta$rcvd)+hardware timer value)modulo $P$ (1)

Because each MP can calculate the offset $\Delta$ using Equation (1) or the MPs can copy a window P and a CCW value from a beacon received from another MP, the MPs each can simply update the offset. The optimal window P and CCW value are subject to change according to topology or application requirements.

The CCF enables channel setup between BSS and WDS traffics given when a MAP can switch to a BSS channel after a CCW, and though this, allows the MAP to manage the WDS together with the BSS. In addition, the framework allows establishment of an Ad-hoc cluster that switches to an agreed channel after, for example, the CCW, thereby supporting channelization in the WDS.

Channel Coordination Mechanism

Figure 4:
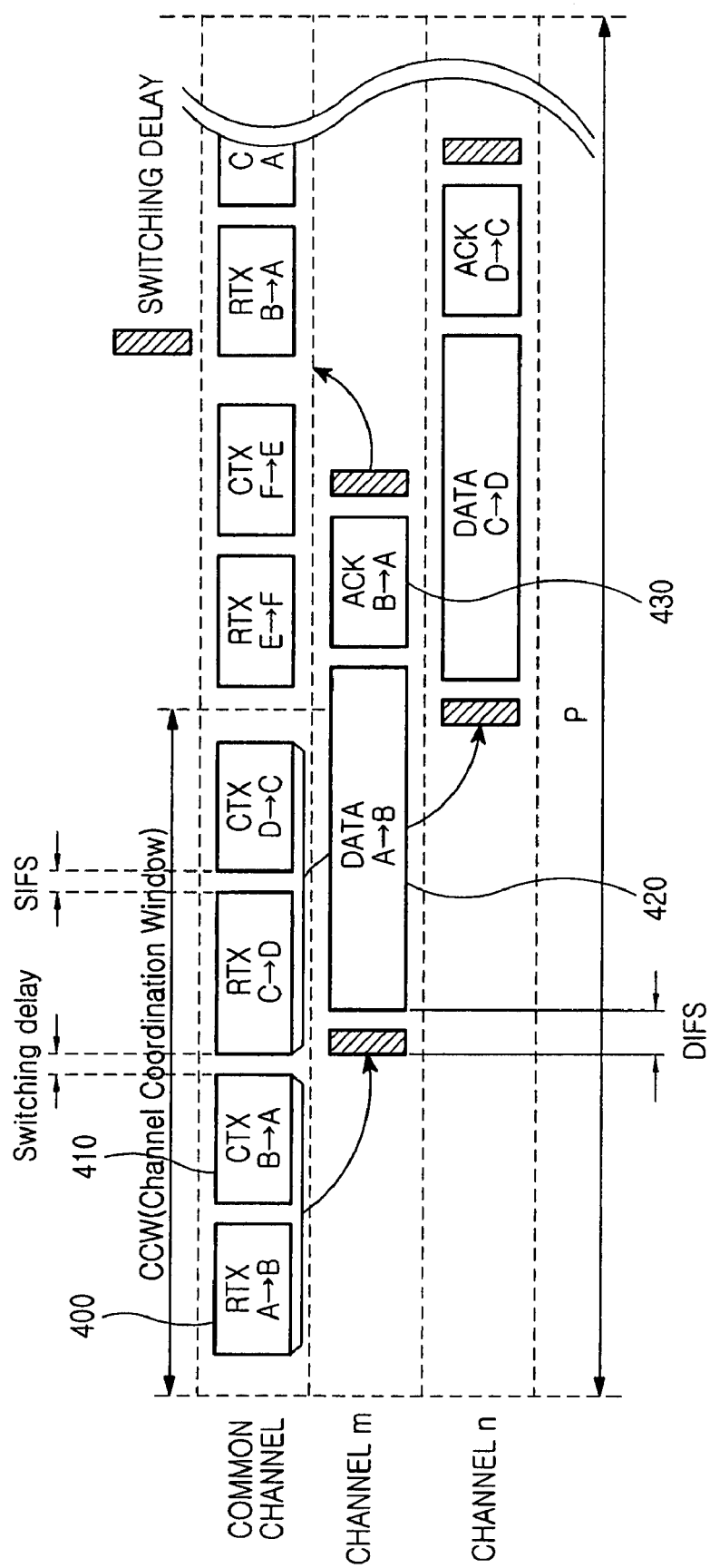
FIG. 4 is a diagram illustrating a channel coordination mechanism on a common channel framework according to an exemplary embodiment of the present invention.

FIG. 4 illustrates a channel coordination mechanism on a common channel framework according to an exemplary embodiment of the present invention.

Referring to FIG. 4, an arbitrary MP pair on a common channel can initialize transmission by transmitting an RTX frame on the common channel. The transmitted RTX frame is delivered to multiple neighbor MPs. Upon receipt of the RTX frame, a particular MP approves frame transmission by transmitting a CTX frame that delivers the same destination channel information. Such frame transmission/reception can also be rejected by establishing a destination channel index with the common channel.

All MPs located at one-hop distance buffer the frames until all MPs can use the common channel. That is, all MPs buffer the non-unicast frames transmitted when they can use the common channel. In addition, when two frames are newly generated between MPs that desire to transmit/receive frames, the common STAs update only the NAV according to a value written in a "duration/ID" field. Because the duration specified to the RTX/CTX frames does not include an occupation time on the destination channel, it is not necessary to leave the common channel in the idle state unnecessarily.

Each MP selects a destination channel to which it will switch a transmission frame. To facilitate channel selection, MPs use a channel utilization vector U for N channels, and the channel utilization vector U can be expressed as Equation (2).

U=[$u_1, u_2, \ldots, u_N$] (2)

where $u_i \in \{0,1\}$, $u_i=0$ indicates that a channel $u_i$ is available, and $u_i=1$ indicates that a channel $u_i$ is in use.

At the CCW start point, U is reset according to an available channel list. For example, U-bits corresponding to the channel, which is unavailable due to a Dynamic Frequency Selection (DFS) condition, are maintained as '1'. The other bits are set to '0'. Each MP updates U as the request is successful. If the MP returns to the common channel after switching to another channel, no more channels are assumed to be in the available state denoted as $u_i=0$. As the MPs, returning to the common channel after data exchange, have no knowledge of the channel using state, they limit RTX signaling only to the previously succeeded destination channel.

If a receiving MP approves the RTX request, MP pair switches to the destination channel within a time shorter than Ts microseconds of a switching delay time. After Ts (100 microseconds) from termination of the CTX frame, a transmitting MP performs Clear Channel Assessment (CCA) for (during) a Distributed Coordination Function (DCF) Inter-Frame Space (DIFS) after the switching delay. The transmitting MP transmits data if it is determined that the channel is empty. However, the transmitting MP returns to the common channel if the channel is not empty. If the receiving MP fails to receive a data frame for the summed time of a Short Inter-Frame Space (SIFS) and a slot time after performing channel switching or sending an Acknowledgement (ACK), the transmitting MP returns to the common channel. After returning to the common channel, the transmitting MP stars a backoff process. Retransmission can happen in the common channel or the destination channel.

Upon failure to acquire a channel for (during) the CCW, the MP can select the channel based on the channel utilization vector U even after the CCW. MPs can continuously perform RTX and CTX exchange even after the CCW, and can indicate a destination channel denoted as 'available'.

To prevent transmission of STAs in the common channel for the CCW, the MAP allows MPs to perform transmission by transmitting a CTX frame whose destination address is a specific mesh address, like all MPs, and can selectively stop the STAs. The stop duration can be about the CCW duration.

According to the foregoing description, a multi-channel operation for the CCW will be described with reference to FIG. 5. When an MP A has data for an MP B, the MP A determines whether the following two conditions are true.

Condition 1: existence of at least one available data channel

Condition 2: transmission completion within a period P

If the two conditions are both true, the MP A selects an arbitrary channel based on the channel utilization vector U. The MP A transmits an RTX 400 to the MP B, and the MP B transmits a CTX 410 to the MP A. When the channel is available, the MP B uses the identical channel index, and when the channel is unavailable, the MP B uses a channel index #0 (common channel). Upon receiving the CTX 410 through the channel index, the MP A updates the channel utilization vector U and performs backoff. Upon failure to receive the CTX 410, the MP A updates the U and allocates a NAV. Then, the MP A and the MP B switch channels. The MP A waits for the DIFS, which is necessary for a network association process. Thereafter, the MP A transmits data 420 to the MP B. When Transmission Opportunity (TXOP) is valid, the MP A sets the duration to an Extended Inter-Frame Space (EIFS), and when TXOP is invalid, the MP A sets the duration to 'SIFS+ACK'.

The MP B transmits an ACK 430. If the duration is greater than 'SIFS+ACK', the MP B does not switch the channel. However, if the duration is not greater than 'SIFS+ACK', the MP B switches to the common channel. When TXOP expires, the MP A switches to the common channel. The MP A and the MP B regard only the free channel as a selection channel, and update the channel utilization vector U according thereto. If an error occurs, the MP A and the MP B are retuned to the common channel.

In operation after the CCW, the MP does not reverse the selection of the approved data channel for the CCW. When use of the data channel is possible, MPs can use the data channel by using a rule for the CCW. When use of the data channel is impossible and the transmission (Tx) is completed within the period P, the MPs can start transmission over the common channel according to the conventional 802.11 rule. While the MP A and the MP B are transmitting and receiving data, the remaining MPs except for the MP A and the MP B buffer their desired transmission data or frames. Such buffering is achieved until all MPs located at one-hop distance can use the common channel. Such a frame, a non-unicast frame that will be transmitted in a multicasting or broadcasting manner, is generated within the period P, and then buffered.

Application of Different Traffic Scenarios

The framework supports not only the point-to-point communication between MPs, but also the traffic scenarios where high-volume BSS traffics are generated. When there are sufficient available channels, each MAP allows BSSs to be located in separated channels. The MAPs can switch their own BSS channels to the end of the CCW. The remaining MPs remain tuned to the common channel. Through this process, the MAPs enable WDS traffics for the CCW. Also, the MAPs can allow APs to use the common channel for the BSS traffics in the framework.

The STAs are never affected by the CCF. The entities for switching the channel include MPs and MAPs. The process in which each MAP selects a BSS channel follows the procedure known in 802.11. Therefore, an access to multiple BSS channels does not need new control or management frames. Selection of a longer delay time P minimizes the scheduling and channel switching overload. The detailed structure for managing parameter scheduling is subject to change according to traffic pattern or network topology.

Figure 5:
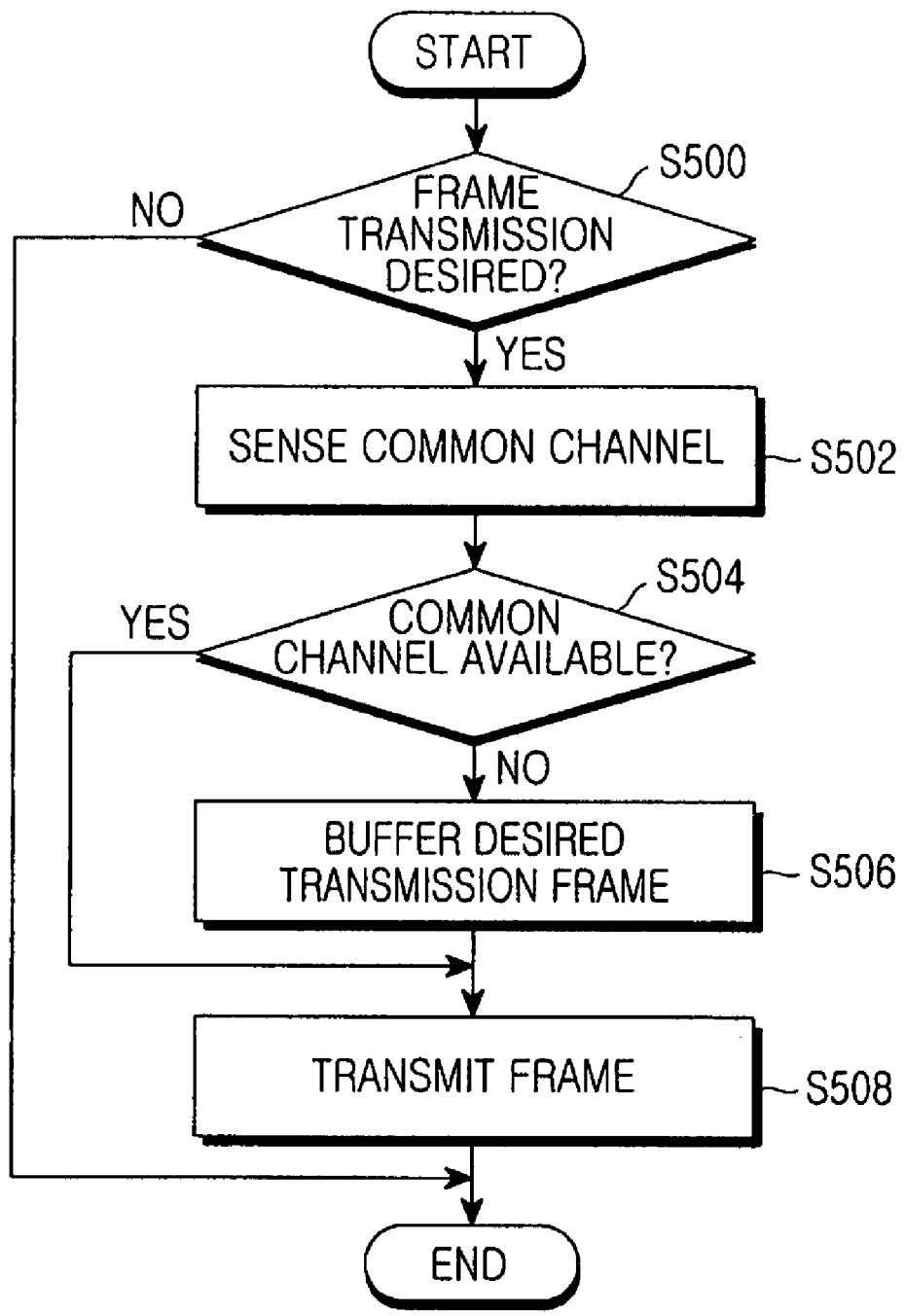
FIG. 5 is a flowchart illustrating a multi-channel MAC method in a WLAN device with a single radio interface according to an exemplary embodiment of the present invention.

FIG. 5 illustrates a multi-channel MAC method in a WLAN device with a single radio interface according to an exemplary embodiment of the present invention.

Referring to FIG. 5, if a frame (for example, non-unicast frame) to be transmitted to neighbor MPs is generated from an application layer of an MP, the MP senses a common channel that it commonly uses with the MPs (steps S500 and S502). As a technique for sensing the common channel, the transceiver can periodically sense the common channel through a beacon frame between MPs. The beacon frame includes a window P and a CCW value for each of the MPs. Such sensing is achieved commonly for all MPs located at one-hop distance. As a result of the sensing, if the common channel cannot be used, the MP buffers the generated non-unicast frame (steps S504 and S506). The use of the common channel in step S504 means that all MPs located at one-hop distance can use the common channel. The reason why a particular MP can determine whether or not its MPs can use the common channel in this way can be determined through the beacon frame periodically exchanged between MPs. The frame buffering in step S504 is achieved until all MPs located at one-hop distance can use the common channel. Also, the frame buffering continues until transmission of a multicasting frame or a broadcasting frame restarts. That is, such buffering starts when channel utilization vector update or RTX/CTX exchange is sensed, and continues until a new CCW starts. In step S506, in the state where the MPs can use the common channel, the MP multicasts or broadcasts the buffered non-unicast frame to the MPs in step S508.

A description will now be made of the simulation results according to an exemplary embodiment of the present invention.

The simulation tool of the present invention has been performed through OPNET ('http://www.opnet.com').

The nodes are set to use 802.11a Physical (PHY) Model. A 24-Mbit/s bandwidth was used for data transmission, and a 6-Mbit/s bandwidth was used for a control frame. The switching delay time was set to 100 microseconds. All devices are assumed to be in the wireless band. Additional parameter setting is shown in Table 1.

TABLE 1

| Parameter | Value | Meaning |
|---|---|---|
| $T_{slot}$ | 9 μs | Length of slot time |
| $T_{DIFS}$ | 34 μs | Length of distributed interface range |
| $T_{SIFS}$ | 16 μs | Length of short interface range |
| Payload | 1500 | Size of payload used for data frame |
| $T_{SW}$ | 100 μs | Delay time consumed for channel switching |
| $T_P$ | 163 μs | Repetition period of CCW |
| T CCW | 16 μs | Duration of CCW |

Two traffic scenarios were considered in detail. A first scenario, called a 'distributed WDS traffic scenario', is a scenario about the situation where communication between a network node and another arbitrary node is achieved. A second traffic scenario, a BSS-heavy traffic scenario, is a scenario about the situation where MAPs have a specific amount of WDS traffic in addition to the BSS traffic.

Distributed WDS Traffic Scenario

For the purpose of the simulation, it is premised that a source-destination pair is not connected for a period P (for example, 10 milliseconds). There are provided five examples by 1, 2, 3, 4, and 8 MP pairs. In each of the MP pairs, if one MP is a source and the other MP is assumed as a sink.

Figure 6:
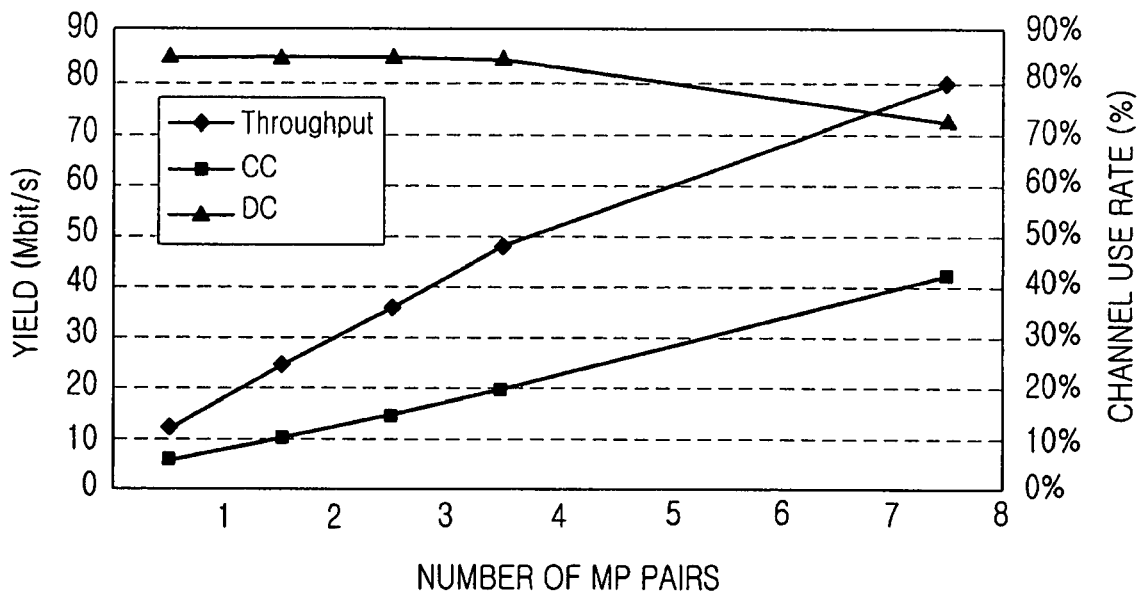
FIG. 6 is a diagram illustrating a change in the total yield and the channel using rate with respect to an increase in the number of MP pairs according to an exemplary embodiment of the present invention

FIG. 6 illustrates a change in the total yield and the channel using rate with respect to an increase in the number of MP pairs according to an exemplary embodiment of the present invention.

Referring to FIG. 6, in the case where a maximum of 8 MP pairs are given, independent orthogonal channels are provided to each communicating MP pair together with the common channel. The total yield is in linear proportion to the number of channels. FIG. 6 also shows the channel using rate together with the total yield. The channel using rate is defined by Equation (3) and Equation (4).

$$UDC = \Sigma(2TSW + TDIFS + TDATA + TSIFS + TACK)/Tsim \quad (3)$$

$$UCC = \Sigma(TDIFS + TRTX + TCTX + TSIFS)/Tsim \quad (4)$$

UDC in Equation (3) means a channel using rate of the destination channel, and UCC in Equation (4) means a channel using rate of the common channel. TRTX, TCTX, TDATA and TACK denote a radio occupation time of the RTX, CTX, DATA and ACK frames, respectively. Tsim denotes a simulation time.

Until 4 MP pairs are on the channels, use of the destination channel remains at 85% in all channels, and use of the common channel increases up to about 20%. For 8 MP pairs, use of the common channel increases up to 40%, and use of the data channel decreases down to 70%. When the MP pairs return to the common channel, use of the data channel abruptly decreases. This is because the MP pairs wait for transmission due to the probability that exchange of RTX/CTX frames will rapidly increase. The waiting time depends on a loss of the use rate of the destination channel.

Figure 7:
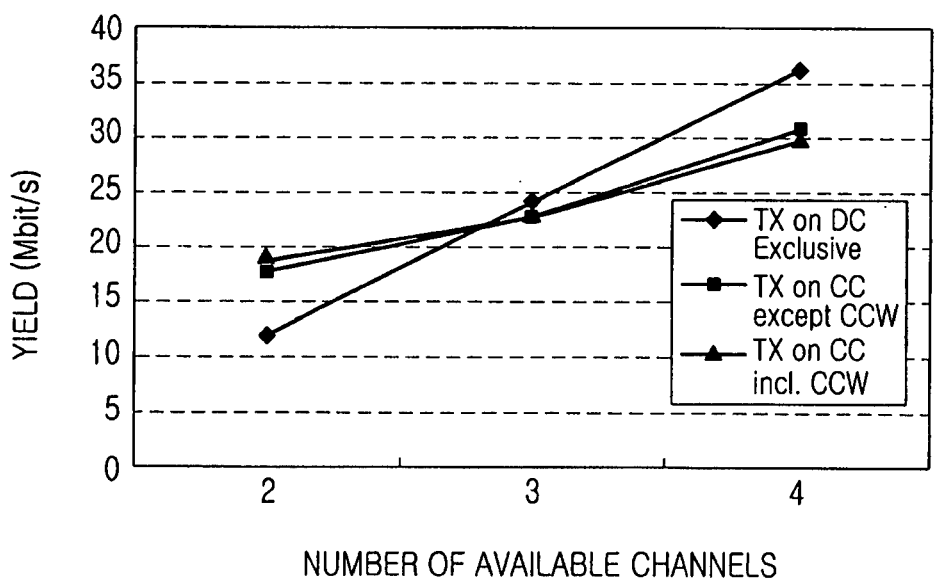
FIG. 7 is a diagram illustrating a change in the total yield by different control options with respect to an increase in the number of MP pairs according to an exemplary embodiment of the present invention.

FIG. 7 illustrates a change in the total yield by different control options with respect to an increase in the number of MP pairs according to an exemplary embodiment of the present invention.

Referring to FIG. 7, there are also provided the simulation results on the influence depending on the number of available channels. That is, the simulation was performed on condition that the number of MP pairs is fixed to 4 and the number of available channels is increased from 1 through 4. Here, 3 different control options are applied: 1) Tx on DC exclusive, 2) Tx on CC except CCW, and 3) Tx on CC incl. CCW. 'Tx on DC exclusive' indicates that transmission of the data frame can happen only on the destination channel rather than the common channel. 'Tx on CC except CCW' indicates that transmission of the data frame can happen on the common channel only after CCW. 'Tx on CC incl. CCW' indicates that transmission of the data frame can always happen on the common channel.

As shown in FIG. 7, it can be understood that when there are 2 available channels and transmission of the data frame on the common channel is not permitted, total yield decreases. When there are 3 available channels, the total yield linearly increases. Because CCW is a part of the period P, contribution of the CCW is very feeble in the case of 'Tx on CC except CCW' and 'Tx on CC incl. CCW'.

Figure 8:
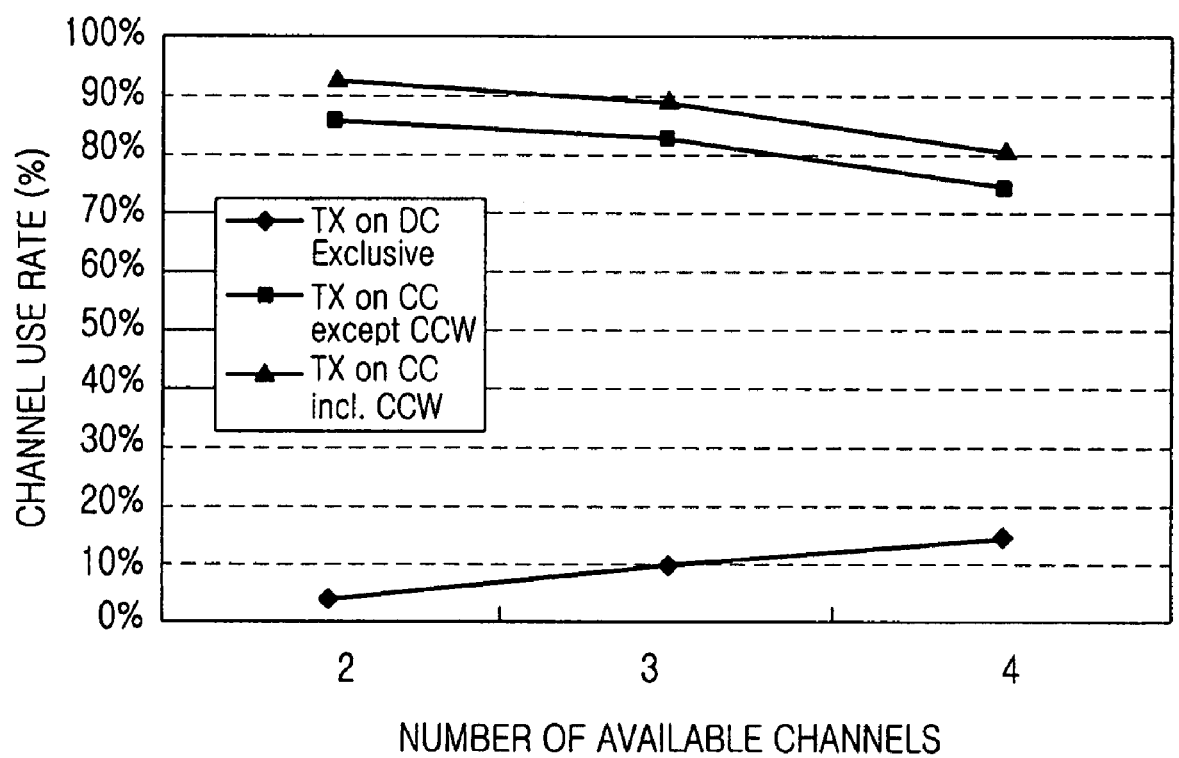
FIG. 8 is a diagram illustrating a change in the channel using rate by different control options with respect to an increase in the number of MP pairs according to an exemplary embodiment of the present invention.

FIG. 8 illustrates a change in the channel using rate by different control options with respect to an increase in the number of MP pairs according to an exemplary embodiment of the present invention.

Referring to FIG. 8, when transmission of the data frame on the common channel is possible, the channel using rate of the common channel, defined by Equation (4), increases as shown in FIG. 8. The increase in the channel using rate of the common channel causes a decrease in the probability that the destination channel will branch off. Therefore, the total yield of 3 or 4 channels is less than the total yield for 'Tx on DC exclusive'.

BSS-heavy Traffic Scenario

Figure 9:
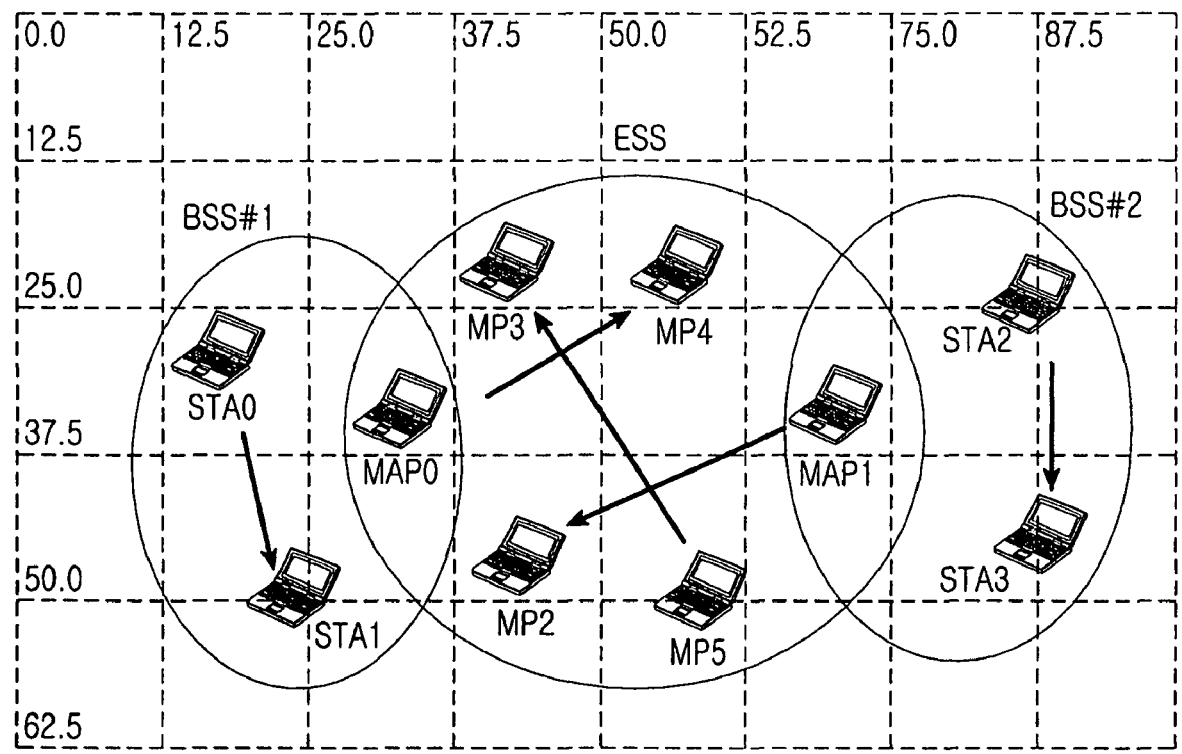
FIG. 9 is a diagram illustrating a topology used for a BSS-heavy traffic scenario according to an exemplary embodiment of the present invention.

FIG. 9 illustrates a topology used for a BSS-heavy traffic scenario according to an exemplary embodiment of the present invention.

Referring to FIG. 9, MAPs include not only WDS traffics but also BSS traffics. In this scenario, it is assumed that BSS traffics of the MAP are highly concentrated, compared with the WDS traffics. The WDS traffics are applied only for the CCW. If the BSS network is located in other channels except for the common channel, the MAPs switch to the BSS channel after the CCW.

The number of MAPs is 1 or 2, and each MAP includes 2 or 4 STAs. The simulation results of this scenario are summarized in Table 2 (where the yield of single-channel MAC≈16.05 Mbit/s).

TABLE 2

| # MAPs | # STAs per MAP | Yield (Mbit/s) | Channel using WDS | BSS1 | BSS2 |
|---|---|---|---|---|---|
| 1 | 2 | 31.170 | 0.967 | 0.828 | N/A |
|   | 4 | 31.978 | 0.964 | 0.875 | N/A |
| 2 | 2 | 46.476 | 0.963 | 0.827 | 0.827 |
|   | 4 | 48.099 | 0.948 | 0.875 | 0.875 |

In the case of 1 MAP, 2 channels (common channel and another channel) are used, and in the case of 2 MAPs, 3 channels are used. In the case of a single channel, an increase in the yield is remarkable when the maximum yield is 16.05 Mbit/s. As described above, the CCF allows BSS traffics located on other channels while providing the probability that it will also process the WDS traffics.

As is apparent from the foregoing description, the multi-channel MAC apparatus and method for a WLAN device with a single radio interface according to the present invention provides a multi-channel MAC method that agrees with the IEEE 802.11 standard and does not need a device with multiple radio interfaces, thereby providing the multi-channel MAC method in which the simple and extended framework is supported in different traffic scenarios.

In addition, if the channel coordination window starts from a start point of the window repeating at regular periods, the multi-channel MAC apparatus and method sense the common channel. As a result of the sensing, if the common channel is in use, the multi-channel MAC apparatus and method buffers the desired transmission non-unicast frame, thereby contributing to prevention of the frame loss.

The above-described exemplary embodiments of a method and apparatus path for establishing a path in a wireless network may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, et and so on, including a carrier wave transmitting signals specifying the program instructions, data structures, et and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A multi-channel Media Access Control (MAC) method for a Wireless Local Area Network (WLAN) device, the method comprising:
    sensing a common channel at a start of a channel coordination window that repeats at regular periods;
    allocating at least two devices to a destination channel during the channel coordination window, using a channel utilization vector that indicates use/nonuse for each of multiple channels; and
    transceiving a frame over the allocated destination channel.

2. The method of claim 1, wherein the transceiving further comprises:
    returning to the common channel when a frame exchange is performed successfully.

3. The method of claim 1, further comprising:
    buffering the desired transmission frame when an update of a channel utilization vector and/or a message being exchanged between neighbor devices is sensed; and
    transmitting the buffered frame when the neighbor devices are each able to use the common channel.

4. The method of claim 3, wherein the exchanged message includes at least one of an update of the channel utilization vector, a Request to Switch (RTX) frame, and a Clear to Switch (CTX) frame.

5. The method of claim 3, wherein the buffering occurs until the channel coordination window restarts.

6. The method of claim 1, wherein the channel utilization vector is expressed as $U=[u_1, u_2, \ldots, u_N]$, where $u_i \in \{0,1\}$, $u_i=0$ indicates that $u_i$ is available, and $u_i=1$ indicates that $u_i$ is in use.

7. The method of claim 1, wherein the channel utilization vector is reset according to an available channel list at the start of the channel coordination window.

8. The method of claim 1, wherein each of the devices updates the channel utilization vector according to a success/failure of a Request to Switch.

9. The method of claim 1, wherein a device with an access point function transmits a CTX frame such that its own Stations (STAs) do not act before the start of the channel coordination window.

10. The method of claim 1, wherein a device with an access point function sets a duration field that covers a duration of departure from the common channel.

11. The method of claim 1, wherein, upon failure to allocate a channel for the channel coordination window, a device allocates a channel according to its own channel utilization vector.

12. The method of claim 1, wherein the frame includes a non-unicast frame.

13. The method of claim 1, wherein the WLAN device comprises a single radio interface.

14. A multi-channel Media Access Control (MAC) method for a Wireless Local Area Network (WLAN) device with a single radio interface, the method comprising:
    sensing a common channel at a start of a channel coordination window that repeats at regular periods;
    buffering a frame when the common channel is in use; and
    transceiving the buffered frame over the common channel when a new channel coordination window starts.

15. The method of claim 14, wherein the frame is buffered when an update of a channel utilization vector is sensed, a message being exchanged between neighbor devices is sensed, or when the channel utilization vector is updated.

16. The method of claim 15, wherein the message includes request and response messages for the frame transmission.

17. The method of claim 15, wherein the channel utilization vector is expressed as $U=[u_1, u_2, \ldots, u_N]$, where $u_i \in \{0,1\}$, $u_i=0$ indicates that $u_i$, is available, and $u_i=1$ indicates that $u_i$ is in use.

18. The method of claim 15, wherein the channel utilization vector is reset according to an available channel list at the start of the channel coordination window.

19. The multi-channel MAC method of claim 15, wherein a device with an access point function from among the neighbor devices transmits a Clear to Switch (CTX) frame such that its own Stations (STAs) do not act before the start of the channel coordination window.

20. The method of claim 14, wherein, upon failure to allocate a channel for the channel coordination window, a device allocates a channel based on its own channel utilization vector.

21. The method of claim 14, wherein the WLAN device comprises a single radio interface.

22. A multi-channel Media Access Control (MAC) apparatus in a Wireless Local Area Network (WLAN) device, the apparatus comprising:
    a channel sensor for sensing a common channel at a start of a channel coordination window that repeats at regular periods;
    a controller for allocating at least two devices to a destination channel during the channel coordination window, using a channel utilization vector that indicates use/nonuse for each of multiple channels; and a transceiver for transceiving a frame over the allocated destination channel.

23. The apparatus of claim 22, wherein the controller buffers the desired transmission frame when a device located at a one-hop distance is occupying the common channel, until all devices are able to use the common channel.

24. The apparatus of claim 23, wherein the buffering starts when an update of the channel utilization vector is detected or a Request to Switch (RTX) and a Clear to Switch (CTX) frame are detected.

25. The apparatus of claim 23, wherein the buffering starts at the start of the channel coordination window that repeats at regular periods.

26. The apparatus of claim 22, wherein the channel utilization vector is expressed as $U=[u_1, u_2, \ldots, u_N]$, where $u_i \in \{0,1\}$, $u_i=0$ indicates that $u_i$ is available, and $u_i=1$ indicates that $u_i$ is in use.

27. The apparatus of claim 22, wherein each of the devices updates the channel utilization vector according to a success/failure of a Request to Switch.

28. The apparatus of claim 22, wherein a device with an access point function transmits a CTX frame such that its own Stations (STAs) do not act before the start of the channel coordination window.

29. The apparatus of claim 22, wherein a device with an access point function sets a duration field that covers a duration of departure from the common channel.

30. The apparatus of claim 22, wherein, upon failure to allocate a channel for the channel coordination window, a device allocates a channel based on its own channel utilization vector.

31. The apparatus of claim 22, wherein the frame includes a non-unicast frame.

32. The apparatus of claim 22, wherein the WLAN device comprises a single radio interface.

33. A non transitory computer-readable recording medium storing a program comprising:

a first set of instructions for sensing a common channel at a start of a channel coordination window that repeats at regular periods;

a second set of instructions for allocating at least two devices to a destination channel during the channel coordination window, using a channel utilization vector that indicates use/nonuse for each of multiple channels; and a third set of instructions for transceiving a frame over the allocated destination channel.

* * * * *